United States Patent

Fenton

[11] 4,191,228
[45] Mar. 4, 1980

[54] TOOL ASSEMBLY

[76] Inventor: John W. Fenton, 1258 Aalapapa Dr., Kailua, Hi. 96734

[21] Appl. No.: 913,578

[22] Filed: Jun. 7, 1978

[51] Int. Cl.$^2$ ............................................. B25B 15/00
[52] U.S. Cl. ................................................. 145/50 A
[58] Field of Search ..................................... 145/50 A

[56] References Cited

U.S. PATENT DOCUMENTS

| | | |
|---|---|---|
| 916,515 | 6/1910 | Montgomery . |
| 1,155,960 | 10/1915 | Ruth . |
| 1,608,620 | 11/1926 | Robinson . |
| 1,753,154 | 4/1930 | Martus . |
| 2,140,449 | 12/1938 | Brown ............................ 145/50 A |
| 2,268,515 | 12/1941 | Olson ............................. 145/50 A |
| 2,397,216 | 3/1946 | Stellin ............................ 145/50 A |
| 2,445,525 | 7/1948 | Gulden .......................... 145/50 A |
| 2,538,350 | 1/1951 | Baule ............................. 145/50 A |
| 2,601,453 | 6/1952 | Phipard . |
| 2,800,829 | 7/1957 | West ............................... 145/50 A |
| 3,470,786 | 10/1969 | Martins ......................... 145/50 A |
| 3,616,827 | 11/1971 | Stillwagon . |
| 3,977,686 | 8/1976 | Buck . |

Primary Examiner—Othell M. Simpson
Assistant Examiner—J. T. Zatarga
Attorney, Agent, or Firm—Dunlap, Codding & McCarthy

[57] ABSTRACT

A tool assembly comprising a drive member, a driven member, and a torque transfer assembly for transferring torque applied to the drive member to the driven member when said members are engaged. The torque transfer assembly includes a male portion formed on one of the drive and driven members and a female portion formed on the other of said members, the male portion being engagable with the female portion via radial projections formed on the male portion which are inserted into mating recesses in the female portion.

5 Claims, 4 Drawing Figures

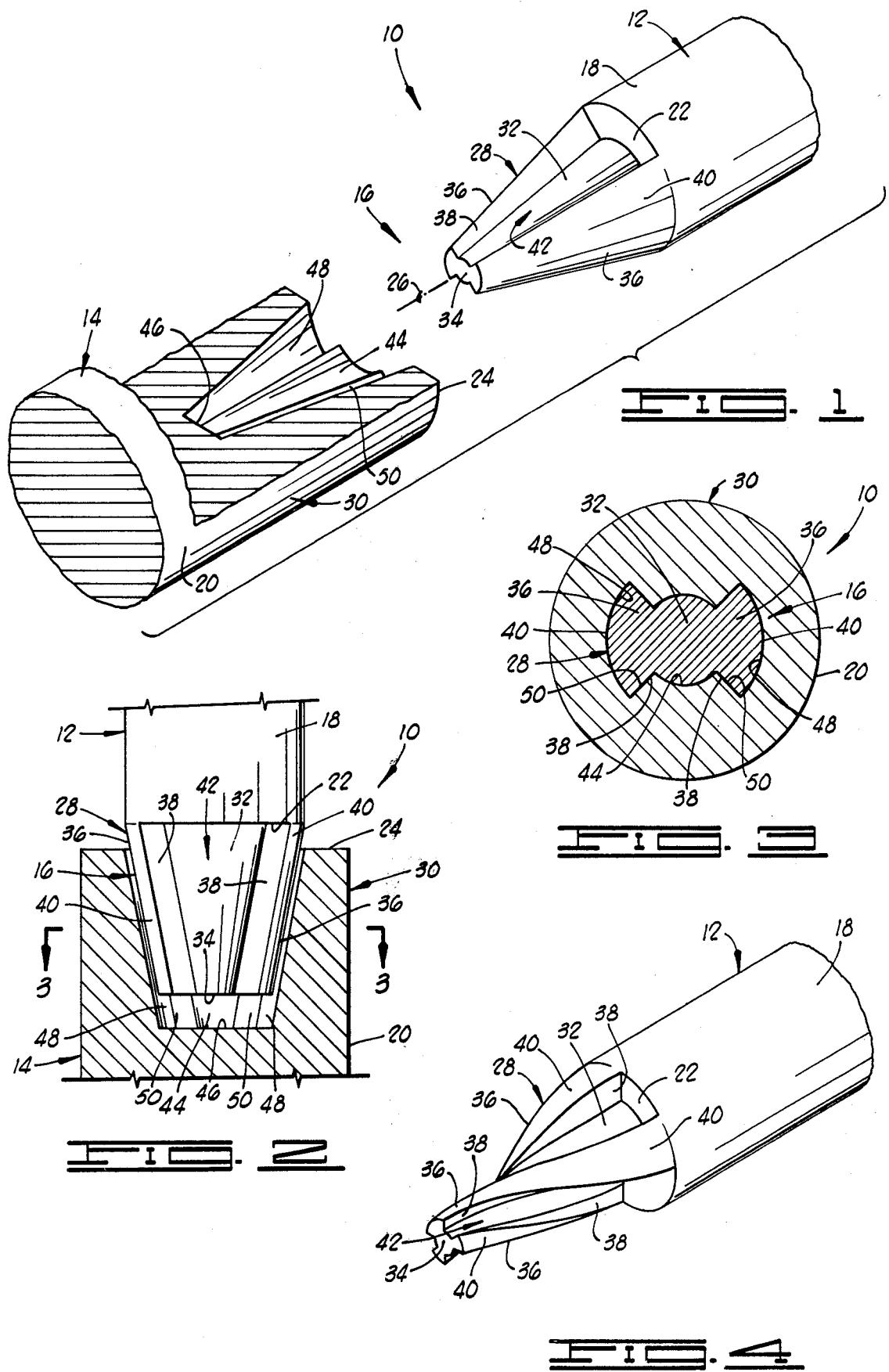

TOOL ASSEMBLY

BACKGROUND OF THE INVENTION

1. Field of the Invention

The present invention relates generally to the field of torque-actuated tool apparatus, and more particularly, but not by way of limitation, to a tool assembly for transferring torque from a drive member to a driven member via a male element engaging with a mating female element.

2. Prior Art

A typical torque-actuated tool apparatus generally comprises a drive member such as, for example, a screw driver or wrench which is engaged to an object such as a screw, bolt, rotary valve or the like for driving or rotating the object via a torque applied to the drive member and transferred therefrom to the object, or driven member. More particularly, a torque transfer assembly usually includes one portion connected to the drive member and a mating portion connected to the driven member and is constructed to transfer the torque from the drive member to the driven member via an interface formed between the mating portions.

The mating portions of a torque transfer assembly may be more clearly defined as a male portion and a female portion which is sized and shaped to receive and, thus, engage or mate with the male portion. The general appropriateness of this analogy can be seen when considering the following: a screwdriver bit (the male portion) fits into one or more slots (the female portion) formed on the head of a bolt or screw; a socket (the female portion) slips over a bolt head (the male portion); and an Allen wrench (the male portion) is inserted into a mating socket (the female portion) of an Allen head screw or bolt.

Male portions such as those discussed above can be further characterized as having one or more projections, blades, ribs or the like extending from a central element such as a bolt, rod, or shank, for example. Correspondingly, a mating female portion will usually have a socket or opening formed therein having properly sized and positioned slots or recesses for receiving said projections, with inwardly extending faces or projections which contact and bear against the adjacent projections or male portions. Thus, a torque applied to the drive member about an axis aligned with the respective male or female portion will be transferred to the other of said portions via the contact or interface established therebetween.

The efficiency of the torque transfer is directly related to the area of surface contact between the male and female portions, as well as the direction in which the torque is transferred therebetween in relation to the direction that the torque is applied. For example, the torque is transferred relatively efficiently when the contacting surfaces are in planer contact and are aligned as closely as possible with the axis of the torque such that the torque is transferred therebetween in a direction perpendicular to said surfaces; as opposed to the surfaces being in point or line contact (which would create undesired stress forces) or being misaligned with said axis such that the torque is oblique to the surfaces. If the contacting surfaces are not aligned properly there is the likelihood that the male and female portions will slip apart or, at least, slip sufficiently to cause an undesired rounding off of the projecting elements.

Tool assemblies like those described above have been utilized in the past to effectuate such operations as radiator valve adjustment and attachment and detachment of threaded fasteners, for example. Through the years, these tool assemblies and related apparatus have often been specifically designed and constructed for particular, and sometimes limited, uses. For example, several wrench devices exist for use particularly with steam radiator valves. These tools are generally known as spud wrenches—a name derived from the spud, or ground nipple, commonly found on steam radiator heating units used during the early part of the twentieth century. Exemplary models of spud wrenches are disclosed in the U.S. Pat. Nos. 1,155,960, issued to Ruth, and 1,608,620, issued to Robinson. A typical spud wrench tool usually includes one or more common sizes of cylindric nipple engaging members, or wrenches, with two longitudinal grooves or recesses formed on each wrench for receiving the lugs of the spud or nipple on the radiator. The different sized wrenches are usually positioned in a stepped manner (shown in Ruth) or at opposite ends of a common rod (shown in Robinson) for servicing a variety of different sized spud valves.

Another wrench used for turning radiator valves, but not of the spud wrench type, is disclosed in the U.S. Pat. No. 961,515, issued to Montgomery. This tool has a plurality of axially aligned blades which are also positioned in a stepped relation to facilitate use thereof with a range of sizes of radiator valves. Montgomery's wrench is also disclosed as being useful as a pipe reamer.

The common "Phillips" screwdriver, and modified counterparts thereof, are also considered as being relevant to the present field of tools. These driving tools primarily comprise a shank having four tapered ribs or wings arranged at one end thereof for insertion into a mating socket of a Phillips head screw, or the like. Two examples of the Phillips type screwdriver are disclosed in the U.S. Pat. Nos. 2,601,453, issued to Phipard, Jr., and 3,616,327, issued to Stillwagon, Jr. The driving tool shown in Phipard, Jr. has an elaborately designed and fluted driving end constructed to provide a perpendicular driving thrust and, thus, prevent the driving tool from being forced out of the socket of a fastener or driven element. The Stillwagon, Jr. patent relates more particularly to a screwdriver bit having a non-magnetic, elastomeric coating formed thereon for retaining a screw type fastener on the end of the bit prior to driving. However, the screwdriver bits shown therein are basically similar in design and construction to those shown in the Phipard, Jr. patent.

Another driving tool which is somewhat similar to the Phillips screwdriver is the gear chuck key such as that shown in the U.S. Pat. No. 3,977,686, issued to Buck. The essence of this patent deals with apparatus for providing a self ejecting chuck key which otherwise appears to be of conventional design and construction.

One other pertinent apparatus is disclosed in the U.S. Pat. No. 1,753,154, issued to Martus, wherein a first headless set screw is used to lock a shaft, or the like, in place, and a similar second set screw is utilized to lock the first set screw in place. More particularly, each set screw has an axial opening formed therein for receiving a wrench tool, with one or more longitudinal slots formed through the set screw for receiving ribs formed radially on the wrench.

SUMMARY OF THE INVENTION

The present invention provides a tool assembly comprising a drive member, a driven member, and a torque transfer assembly. The torque transfer assembly includes a male portion formed on one of the drive and driven members and a female portion formed on the other of said members, with the male portion engagable with the female portion. The torque transfer assembly is utilized for transferring a torque applied to the drive member from the drive member to the driven member. The drive member is generally in the form of a torque apparatus such as a lever arm or a shaft, with the driven member representing an object to be driven or turned, such as a threaded bolt or a rotary valve, for example.

The male portion is generally frusto-conic in shape and has at least one frusto-conic section or lobe extending radially therefrom in either a straight or spiral manner. The female portion has a frusto-conic opening or recess formed therein with at least one frusto-conic slot extending from the recess. The opening of the female portion is shaped to receive the male portion with the lobes of the male portion being radially aligned and in planer contact with the slots of the female portion. When torque is applied to the drive member, the torque is transferred from the drive member to the driven member via the radially aligned lobes and slots.

It is one object of the present invention to provide an improved tool assembly for more efficiently transferring torque from a drive member to a driven member.

One other object of the present invention is to provide a torque transfer assembly having a male portion and a mating female portion, with one of said portions formed on the drive member and the other of the male and female portions formed on the driven member.

Still another object of the present invention is to provide a torque transfer assembly which transfers torque from a drive member to a driven member in the direction of the torque and perpendicularly to radially aligned torque transfer faces which are co-planer to the axis of the torque.

Another object of the present invention is to provide a tool assembly having a drive member which can effectively be engaged with a range of sizes of driven members, and vice versa.

Yet another object of the present invention is to provide a tool assembly having a drive member capable of driving or turning a driven member in only one direction, with the drive member disengaging from the driven member when turned in the opposite direction.

Other objects, advantages, and features of the present invention will become apparent from the following description of the preferred embodiment when read in conjunction with the drawings and appended claims.

BRIEF DESCRIPTION OF THE DRAWINGS

FIG. 1 is a partially cut-away, perspective view of the preferred embodiment of the tool assembly of the present invention showing the male and female portions thereof in a disengaged position.

FIG. 2 is a cross-sectional view of a modified version of the tool assembly illustrated in FIG. 1, showing the male and female portions thereof engaged.

FIG. 3 is a cross-sectional view of the tool assembly shown in FIG. 2 and taken along the line 3—3.

FIG. 4 is a perspective view of a male portion of an alternate embodiment of the tool assembly shown in FIG. 1.

DESCRIPTION OF THE PREFERRED EMBODIMENT

Referring to the figures in general and to FIG. 1 in particular, shown therein and designated by the general reference numeral 10 is a tool assembly constructed in accordance with the present invention. The tool assembly 10 primarily comprises a drive member 12, a driven member 14 engagable with the drive member 12, and a torque transfer assembly 16.

For convenience of reference, the drive member 12 is illustrated as a first shaft 18 which may form a portion of a torque apparatus constructed to produce a torque or driving force. Similarly, the driven member 14 is illustrated as a second shaft 20 which may form a portion of an object which is to be driven or turned via the torque apparatus. The torque transfer assembly 16 is comprised of one portion connected to one end 22 of the drive member 12, and another portion connected to one end 24 of the driven member 14. In an engaged position of the drive member 12 and the driven member 14, the torque transfer assembly 16 facilitates transfer of torque applied to the drive member 12 about an axis 26. The torque apparatus may be in the form of a driving or turning tool, such as, for example, a lever arm disposed perpendicular to the axis 26, or a shaft aligned with the axis 26; and the driven member 14, or the object which is to be driven or turned, may, for example, form a portion of a threaded bolt, a rotary valve, or the like.

More particularly, the torque transfer assembly 16 comprises a male portion 28 formed on one of the drive and driven members 12 and 14, and a female portion 30 formed in the other of said members 12 and 14. In other words, if the male portion 28 is formed on the drive member 12, then the female portion 30 is formed in the driven member 14. On the other hand, should the female portion 30 be formed in the drive member 12, it follows that the male portion 28 would be formed on the driven member 14. For the purposes of illustration, the male portion 28 is shown formed on the end 22 of the drive member 12 (or the first shaft 18) with the female portion 30 being formed in the end 24 of the driven member 14 (or the second shaft 20). In addition, it should be noted that in the engaged position of the drive and driven members 12 and 14, the male portion 28 will be inserted into and mated or engaged with the female portion 30 as will be described below.

The male portion 28 of the torque transfer assembly 16 is comprised of a frusto-conic hub 32 which tapers from the end 22 of the drive member 12 to a tip 34, and one or more frusto-conic sections or lobes 36 connected to and extending radially from the hub 32. In an operable position of the tool assembly 10, the axis of the hub 32 and, therefore, each lobe 36, is aligned with the axis 26. Thus, all such common axes may hereinafter be referred to as the axis 26. Each lobe 36 encompasses a predetermined degree of arc less than 360° and has a pair of angularly opposed side faces 38 co-planer with the axis of the hub 32, with an arcuate outer face 40 extending between each related pair of side faces 38. However, if more than one of the lobes 36 is present, the combined degree of arc encompassed thereby will be less than 360°. Thus a gap 42 will be present between the side faces 38 of adjacent lobes 36.

In a preferred form, the arcuate outer face 40 of each lobe 36 tapers toward the axis of the hub 32. As shown in FIG. 1, each lobe 36 may converge toward the axis of the hub 32 such that the width of each side face 38 (i.e., the radial distance from the hub 32 to the arcuate outer face 40) decreases or otherwise varies proportionally from the end 22 to the tip 34. Alternatively, as shown in FIG. 2, each lobe 36 may taper at the same rate as the hub 32 so that the width of each side face 38 is substantially constant from the end 22 to the tip 34.

The female portion 30 of the torque transfer assembly 16 is comprised of a frusto-conic recess 44 which tapers inwardly from the end 24 of the driven member 14 to a seat 46, and one or more frusto-conic slots 48 extending radially from the recess 44. In the operable position of the tool assembly 10, the axis of the recess 44 and, therefore, each slot 48, is also aligned with the axis 26. Each slot 48 has a pair of angularly opposed side faces 50 co-planer to the axis of the recess 44 with the recess 44 and each slot 48 being sized and positioned to receive the hub 32 and one of the lobes 36, respectively, of the male portion 28. In other words, when the drive member 12 and the driven member 14 are engaged, the side faces 38 of each lobe 36 will extend parallel to, and be in planer contact with, the side faces 50 of the respective slot 48. Thus, any torque applied to the drive member 12 will be transferred from the drive member 12 to the driven member 14 specifically via the radially aligned side faces 38 and 50 of the lobes 36 and the slots 48, respectively, since the axes of the hub 32 and the recess 44 are aligned with the axis 26 of the torque.

Since the radially aligned side faces 38 and 50 are in planer contact, the torque is transferred therebetween with substantially no lost motion or slippage. In addition, due to the radial alignment of the side faces 38 and 50 with the axis 26, the torque is transferred from the drive member 12 to the driven member 14 in a direction perpendicular to the contacting side faces 38 and 50.

The length of the male portion 28 shown in FIG. 1—i.e., the distance from the end 22 of the first shaft 18 to the tip 34 of the male portion 28—is substantially equal to the depth of the female portion 30 shown therein—i.e., the distance from the end 24 of the second shaft 20 to the seat 46. Furthermore, the degree of convergence of the hub 32 and the lobes 36 of the male portion 28 is the same as the degree of convergence of the recess 44 and the slots 48, respectively, of the female portion 30. The degree of convergence of any one of the above mentioned frusto-conic elements, sections or portions is defined as the angle formed between the respective element, section or portion and the axis thereof (i.e., the axis 26). Thus, it should be clear that the hub 32 and the lobes 36 of the male portion 28 shown in FIG. 1 are sized to completely fill the recess 44 and the slots 48 of the female portion 30 shown therein when the drive and driven members 12 and 14 are engaged. In the engaged position of the drive and driven members 12 and 14, the tip 34 of the male portion 28 abuts the seat 46 of the female portion 30 and the end 22 of the first shaft 18 abuts the end 24 of the second shaft 20.

However, it should be noted that the male portion 28 could readily be inserted into the recesses of a range of sizes of female portions such as the female portion 30. For example, it is not necessary for the tip 34 to abut the seat 46 or for the end 22 of the first shaft 18 to abut the end 24 of the second shaft 20 should the diameter of the male portion 28 at the tip 34 be greater than the diameter of the female portion 30 at the seat 46. The male portion 28 can also be readily inserted into the recess of a female portion 30 having a depth greater than the length of the respective male portion 28, provided that the degrees of convergence thereof are substantially equal.

As shown in FIG. 2, in conjunction with FIG. 3, it is evident that when the degrees of convergence of the male and female portions 28 and 30 are the same, the male portion 28 can be fully inserted into the recess 44 of the female portion 30. In this instance, each side face 38 of each lobe 36 will positively contact an associated one of the side faces 50 of an adjacent slot 48. Thus, the contacting side faces 38 and 50 will be co-planer with the axis 26. Therefore, substantially all of the torque applied to the drive member 12 will be transferred to the driven member 14 perpendicular to the axis of rotation 26 for maximum effectiveness.

DESCRIPTION OF FIG. 4

Referring now to FIG. 4, shown therein is an alternate embodiment of the tool assembly 10 of the present invention wherein each of the lobes 36 is spiralled a predetermined number of degrees about the hub 32. As before, each lobe encompasses less than 360° of arc and, when a plurality of the lobes 36 are present, the combined degree of arc encompassed thereby is less than 360° with each lobe 36 encompassing about the same degree of arc. Furthermore, each lobe 36 spirals about the hub 32 approximately the same number of degrees. Of course, the slots 48 extending from the recess 44 of the mating female portion 30 are also spiralled accordingly to receive the spiralled lobes 36, with the male portion 28 effectively being threaded into the female portion 30 when the drive member 12 and the driven member 14 are engaged.

It is contemplated that the tool assembly 10 shown in FIG. 4 could be utilized in security applications, or the like, where it is desired that the driven member 14 be limited to movement in only one rotational direction. For example, it may be desired to have an object such as a threaded bolt which can be screwed into a bore hole but not subsequently removed therefrom. The object will be threaded into the bore hole when torque is applied to the tool assembly 10 in the right-hand direction, with the drive and driven members 12 and 14 disengaging when a reverse torque is applied in the left-hand direction. However, the driven member 14 and, thus, the object will remain stationary, as opposed to rotating or being driven in the left-hand direction.

Changes may be made in the construction of the parts or elements, or in the methods as described herein, without departing from the spirit and scope of the invention as defined in the following claims.

I claim:

1. In a tool assembly having a drive member and a driven member engagable with the drive member so that torque can be applied thereto, the improvement comprising:

a male portion formed on one end of the drive or driven member, the male portion including a frusto-conic shaped hub which tapers away from the end of the member on which the male portion is formed to a flat which is perpendicular to the axis of the hub, and at least one spiralled lobe connected to and extending radially from the hub and spirally about the axis of the hub, the spiralled lobe comprising an outer arcuate face and a pair of angularly opposed side faces each coplanar with the axis of the hub, the spiralled lobe as a whole tapering in the same direction as the hub and converging therewith to a flat which is coplanar with the flat of the hub and a female portion formed on one end of the other of the drive and driven member, the female portion formed as a frusto-conic shaped recess which tapers inwardly from the end of the other of the members and ends in a flat bottom and at least one spiralled slot extending radially from the recess and ending in a flat bottom coplanar with the bottom of the recess, the recess and the spiralled slot being sized and positioned to threadably engage the hub and the spiralled lobe, respectively, of the drive member to operatively engage the drive member and the driven member so that when torque is applied to the drive member in one direction torque is transferred to the driven member and when torque is applied to the drive member in an opposite direction the driven member remains stationary and the drive member is disengaged from the driven member.

2. The apparatus of claim 1 wherein the spiralled lobe is spiralled a predetermined number of degrees about the hub.

3. The apparatus of claim 2 wherein the male portion is characterized further as comprising a plurality of the spiralled lobes with the spiralled lobes encompassing a combined degree of arc of less than 360°.

4. The apparatus of claim 3 wherein each spiralled lobe is characterized further as comprising about the same degree of arc.

5. The apparatus of claim 3 wherein each spiralled lobe is characterized further as being spiralled approximately the same number of degrees.

* * * * *